US006999320B2

(12) United States Patent
Fan

(10) Patent No.: US 6,999,320 B2
(45) Date of Patent: Feb. 14, 2006

(54) EXPANSIBLE AND DETACHABLE HOUSING OF ELECTRONIC DEVICE

(75) Inventor: Cheng-Yuan Fan, Taipei (TW)

(73) Assignee: First International Computer, Inc., Taipei (TW)

( * ) Notice: Subject to any disclaimer, the term of this patent is extended or adjusted under 35 U.S.C. 154(b) by 42 days.

(21) Appl. No.: 10/740,673

(22) Filed: Dec. 22, 2003

(65) Prior Publication Data

US 2005/0134156 A1 Jun. 23, 2005

(51) Int. Cl.
*H05K 7/14* (2006.01)

(52) U.S. Cl. .................... 361/725; 312/223.3; 361/679; 403/330

(58) Field of Classification Search ........ 361/679–687, 361/724–727; 312/223.1, 223.6; 364/708.1; 292/DIG. 17, DIG. 30; 70/58, 59; 345/168; 112/102.5; 403/330

See application file for complete search history.

(56) References Cited

U.S. PATENT DOCUMENTS 6,711,002 B1 * 3/2004 Fan ............................ 361/679
6,814,014 B1 * 11/2004 Mamiya .................. 112/102.5

* cited by examiner

*Primary Examiner*—Hung Van Duong
(74) *Attorney, Agent, or Firm*—Troxell Law Office, PLLC

(57) ABSTRACT

An expansible and detachable housing of electronic device has two half-housings and two base plates with a detachable pivot element respectively connected to the bottom plates. Whereby, when the two bottom plates are formed a plane, the two half-housings are formed an extension state, or when the two bottom plates is caused to be perpendicular to each other, the two half-housing bodies is allowed to assemble to form a complete housing, or when the two bottom plates are separated, the two half-housings is formed a separation state. Therefore, the present invention can allow each electronic element to be assembled easily and to be maintained conveniently. Furthermore, electronic elements can be conveniently assembled in the two half-housing bodies separately at two different locations according to needs, and then, integrated into a whole body.

14 Claims, 5 Drawing Sheets

EXPANSIBLE AND DETACHABLE HOUSING OF ELECTRONIC DEVICE

BACKGROUND OF THE INVENTION

1. Field of the Invention

The present invention relates to a housing of an electronic product with three-dimensional modeling, such as a computer, independence type CD-ROM drive or stereo, more particularly to an extensible and detachable housing for arranging, assembling and maintaining each electronic element in the housing conveniently.

2. Description of Related Art

At present, several housings of personal computer have a detachable upper plate and side plate, a frame body installed in each of them for assembling each electronic element. Taiwan patent 440,127 discloses a computer housing composed of a base seat and upper cover. Taiwan patent 479,927 discloses a computer housing with twin-doors. The computer housings mentioned above are all assembled outside a frame body, electronic elements are all assembled inside the housing; the assembly and maintenance of electronic elements are very inconvenient because the space inside the housing is very small.

For improving the defects of the conventional computer housing mentioned above, the applicant of the present invention has filed patent applications of an expansible housing of a electronic device in many countries, the application numbers respectively are Taiwan patent application no. 9,2200,495, U.S. patent application Ser. No. 10/379,664, Japanese patent application no. U2003-000905 and Chinese patent application no. 03,201,337.X. Two of the patent applications mentioned above have already been granted with utility patents in Taiwan and Japan. The patent discloses an expansible housing structure for a electronic device used to install electronic elements in the housing conveniently, and receiving grooves for electronic elements is combined therewith so as to allow the housing to have both framing function to simplify the structure of the frame body and special detachable pivoting elements for expanding and assembling the housing conveniently.

SUMMARY OF THE INVENTION

For further allowing the expansible housing to have a detachable function, to enable to assemble electronic parts therein easier, to do future maintenance more conveniently and to assemble electronic parts in the two half-housings separately at different places according to the needs and to assemble them to one body, the present invention is proposed.

The main object of the present invention is to provide a housing of an electronic product, having an expansible and detachable structure for assembling electronics parts in the housing conveniently.

Another object of the present invention is to provide a housing of an electronic product, having an expansible and detachable structure to allow electronics parts to be assembled in two half-housings at different places according to the needs, and then to assemble them into one body.

Another object of the present invention is to provide a housing of an electronic product, having a special detachable pivoting element so as to expand, detach and assemble the housing conveniently.

Another object of the present invention is to provide a housing of an electronic product, having a buckling unit so as to assemble and expand two half-housings conveniently.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 1:
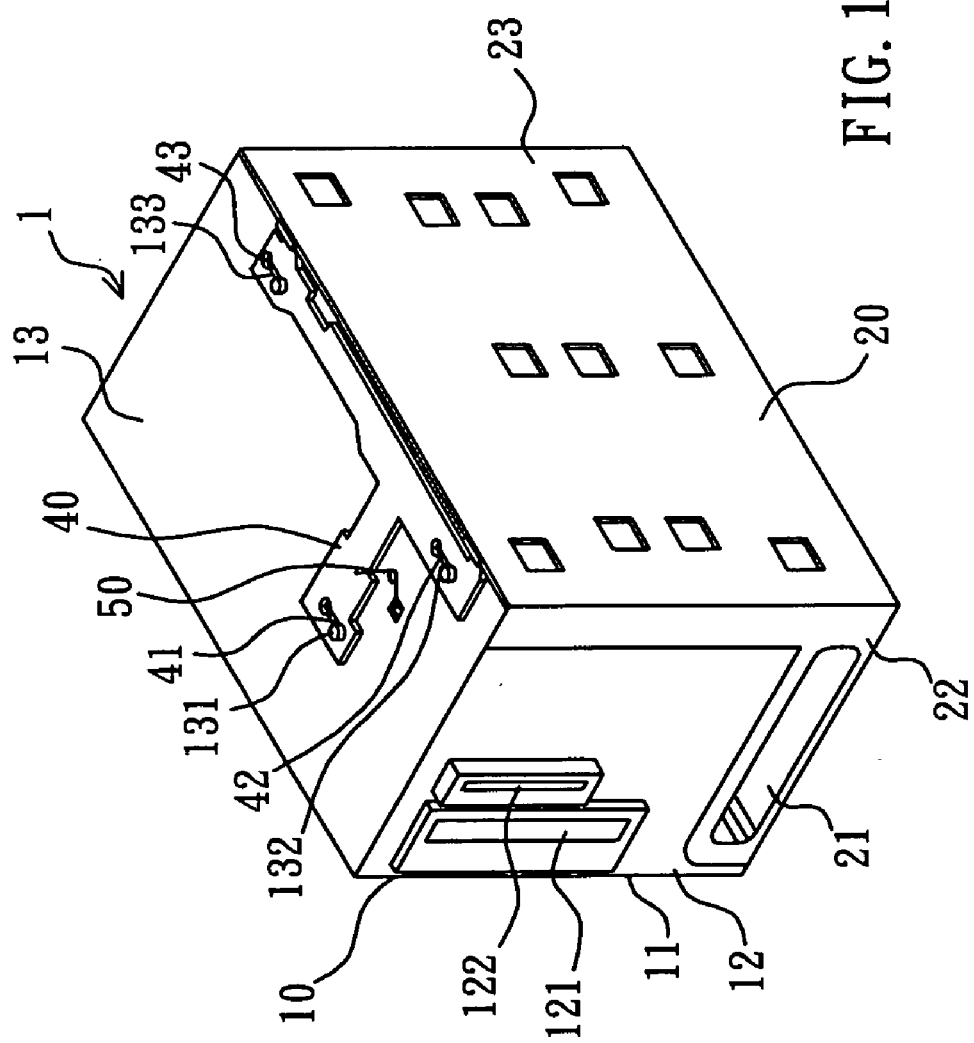
FIG. 1 is a three-dimensional schematic view, showing an assemblage state of a housing according to the present invention.
Figure 2:
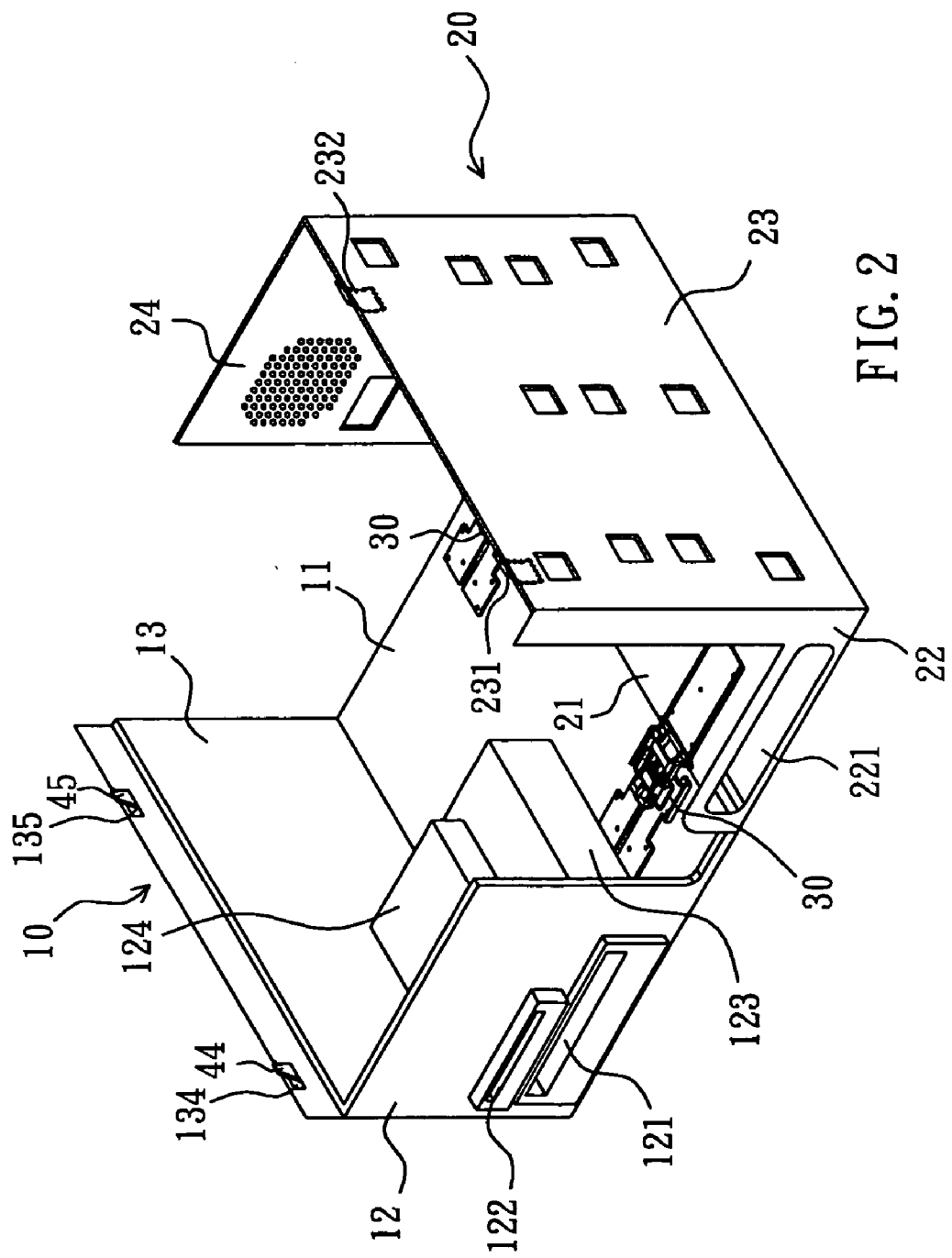
FIG. 2 is a three-dimensional schematic view, showing an expansion state of a housing according to the present invention.
Figure 3:
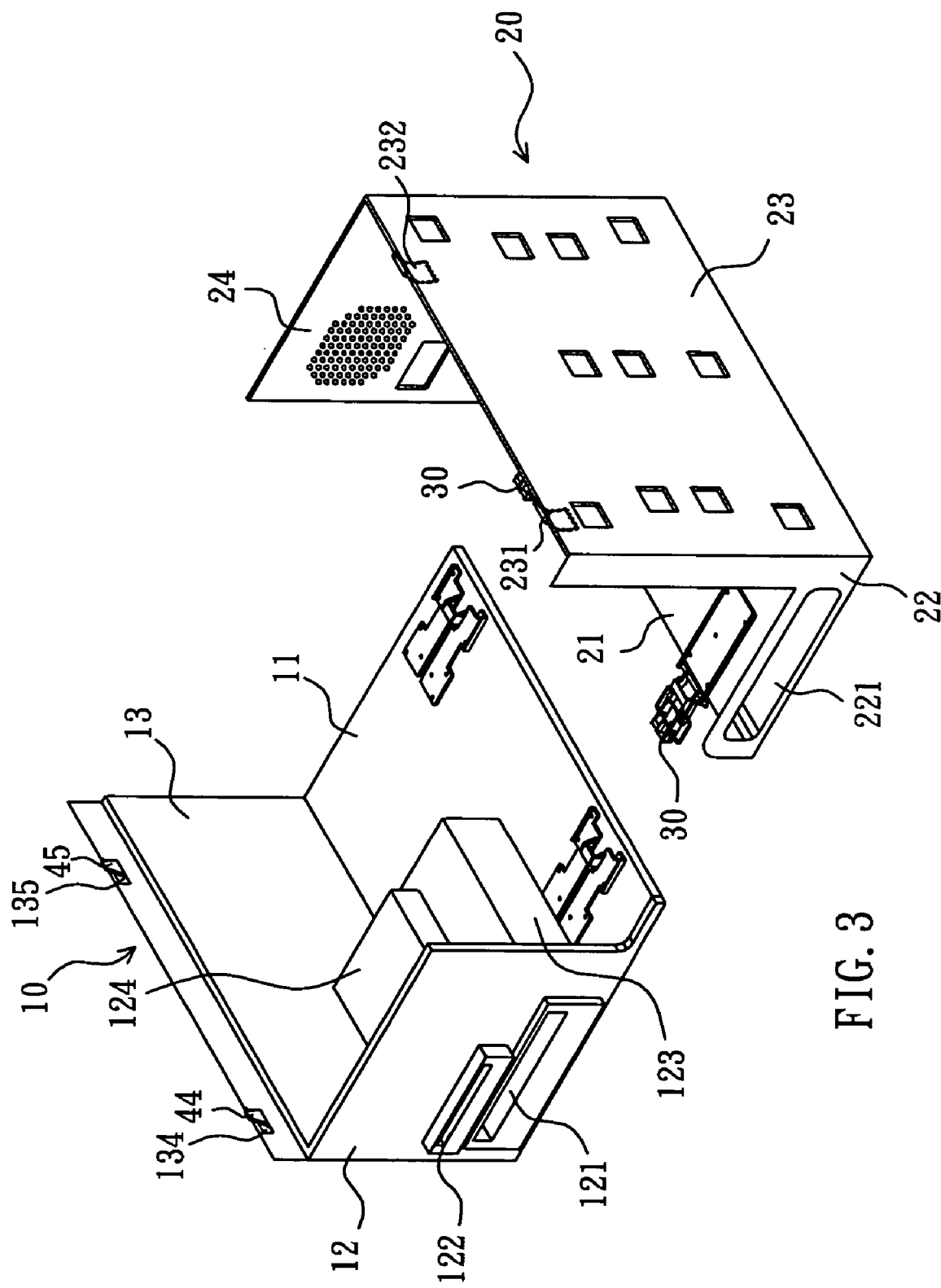
FIG. 3 is a three dimensional schematic view, showing a detachment state of a housing according to the present invention.

Please refer to FIGS. 1, 2 and 3. A housing 1 according to the present invention comprises two half-housings 10 and 20. As FIG. 2 shows, the half-housing 10 has a bottom plate 11 therein combined with a front plate 12 and side plate 13. The half-housing 20 has a bottom plate 21 combined with a front plate 22, side plate 23 and back plate 24. Two base plates of two detachable pivot elements 30 are connected respectively to the two bottom plates 11 and 21. Whereby, the two bottom plates 11 and 21 can be expanded to form a plane state, or can be assemble to form a vertical state as FIG. 1 shows, or can be detached to form a detachment state as FIG. 3 shows.

The front plates 12 and 22 have groove holes 121, 122 and 221 respectively for receiving electronic elements such as CD-ROM driver and disk driver respectively. The groove holes 121 and 122 have groove walls 123 and 124 in them respectively so as to form a space for receiving the electronic element.

As FIG. 1 shows, one side at the upper side of the side plate 13 is combined with a buckling unit 40. The buckling 40 has three groove holes 41, 42 and 43 therein receiving respectively three projecting columns 131, 132 and 133. The three projecting columns 131, 132 and 133 are combined at the upper side of the side plate 13 and have respectively cap portions with bigger outer diameter at the upper sides of them, the cap portions are passed through the holes with a bigger diameter at sides of the three groove holes 41, 42 and 43 and stuck at the outer sides of the holes with a smaller diameter, so as to allow the buckling unit 40 not to separate from the side plate 13, but can allow the three groove holes 41, 42 and 43 to move to and fro along the flank sides of the projecting columns 131, 132 and 133. An elastic unit 50, such as a twisting spring, is connected between the buckling unit 40 and the side plate 13 so as to cause the buckling unit 40 always to bear a spring force that the elastic unit 50 pushes it toward a flank side. The buckling 40 has two buckling ends 44 and 45 therein that are extended downward out of the groove holes 134 and 135 at the flank side of the side plate 13 to the outside of them, as FIG. 2 shows. Two ear sheets 231 and 232 can be combined at the places inside the flank side of the side plate 23 corresponding to the two buckling ends 44 and 45. The ear sheets 231 and 232 can be buckled in the two buckling ends 44 and 45.

When the two half-housings 10 and 20 is formed as an assemblage state shown in FIG. 1, the two buckling ends 44 and 45 of the buckling unit 40 are buckled respectively with the two ear sheets 231 and 232 so as to cause the two side plates 13 and 23 to be buckled together. The two side plates 13 and 23 cannot be separated unless an outer force is exerted to cause the buckling unit 40 to squeeze the elastic element 50 to move toward another side to allow the two buckling ends 44 and 45 to separate from the place that the two buckling ends 44 and 45 are buckled with the two ear sheets 231 and 232.

Figure 4:
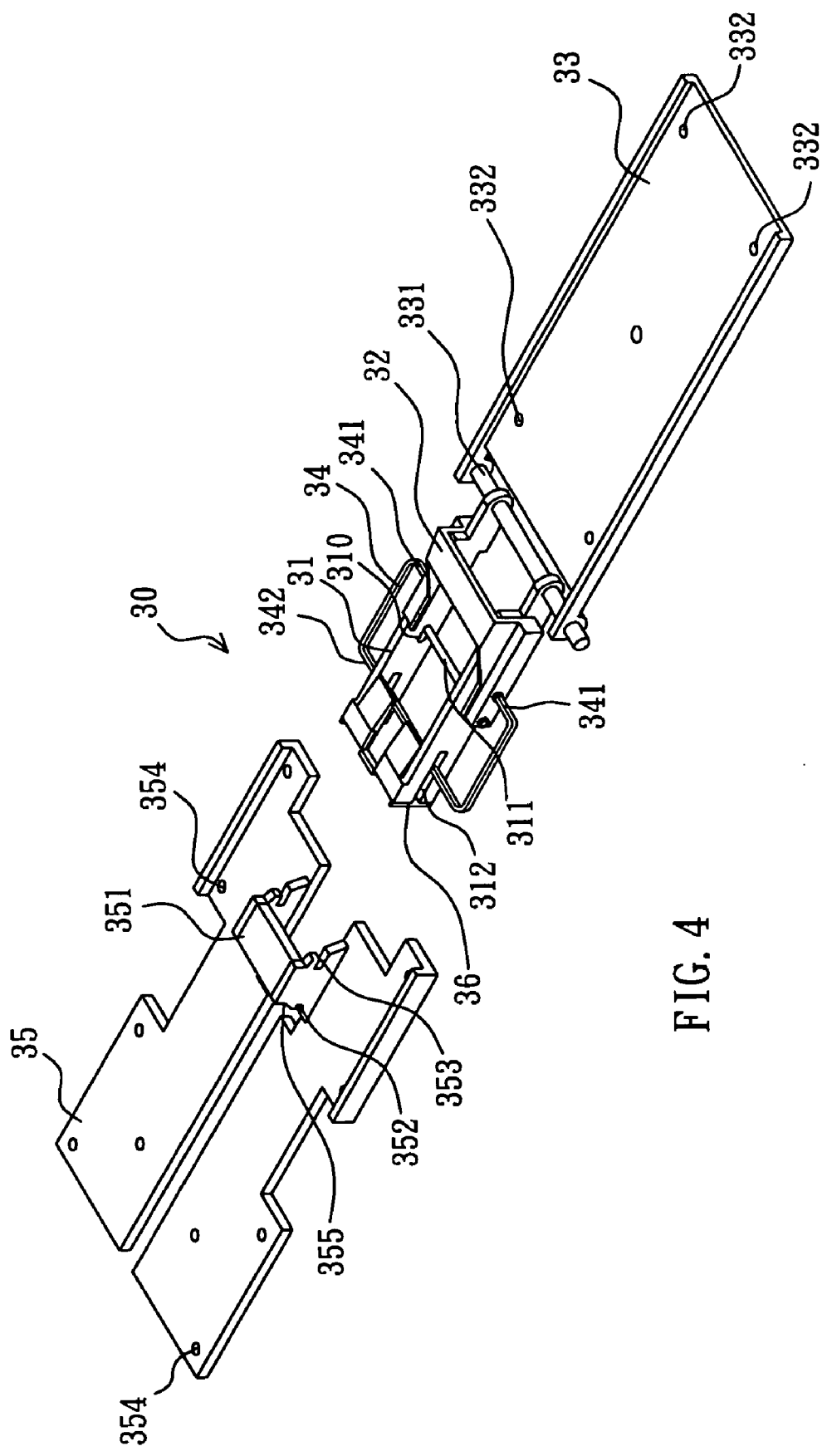
FIG. 4 is a three dimensional schematic view, showing a detachable pivoting element according to the present invention.
Figure 5:
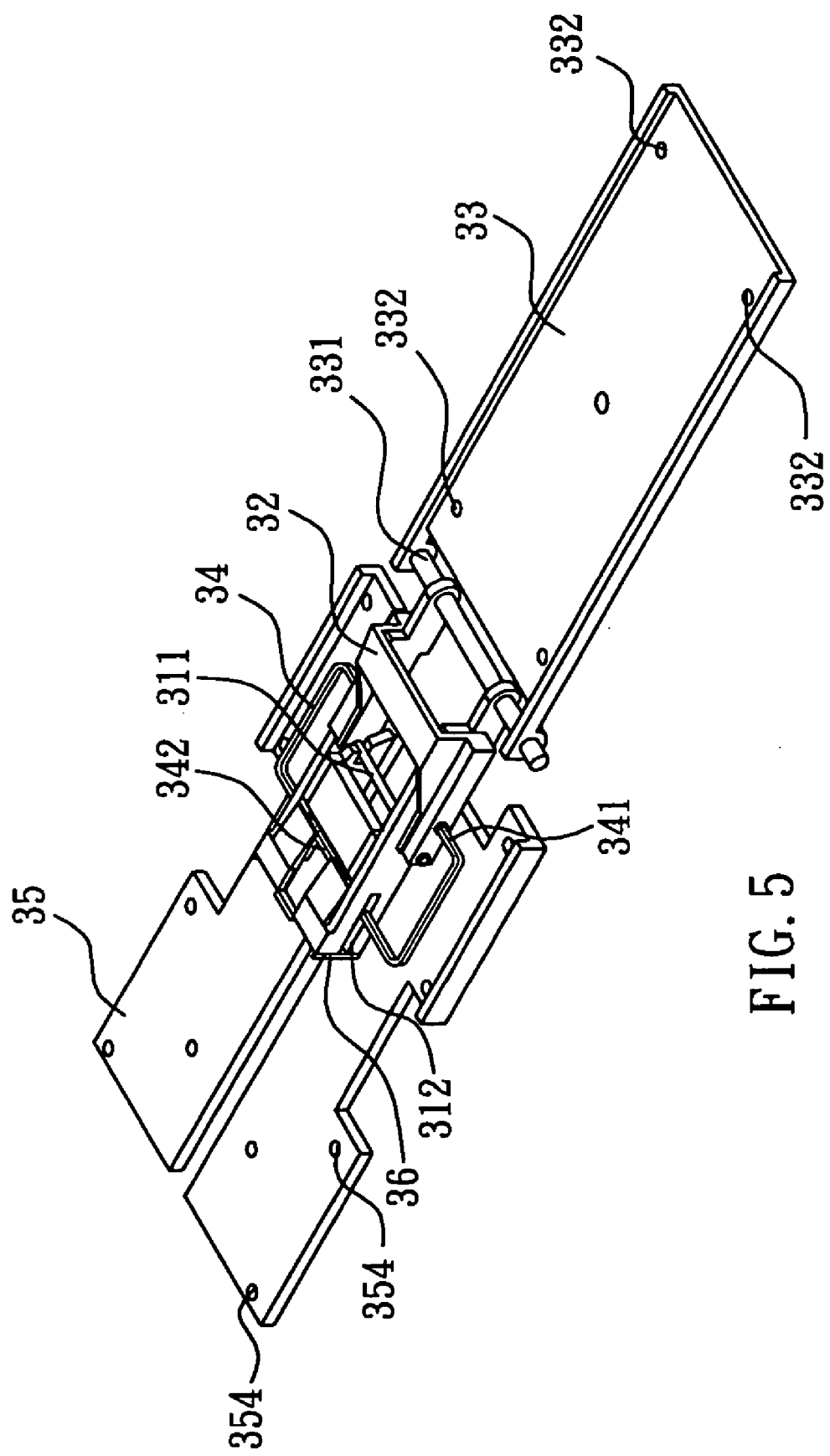
FIG. 5 is a three-dimensional state, showing a detachment state of a detachable pivoting element according to the present invention.

Please refer to FIGS. 4 and 5, a detachable pivoting element 30 comprises a seat body 31 with a long hole 310 connected with a sliding shaft 311. The front end of a mobile sheet 32 is pivoted to the sliding shaft 311. The front end of a base plate 33 is connected to a rotating shaft 331. the rear end of the seat body 31 is pivoted to the rotating shaft 331.

The mobile sheet 32 is pivoted to two rear parts 341 of a mobile frame 34 behind a place that it is pivoted with the sliding shaft 311. The front end of the seat body 31 has a guiding groove 312. A front shaft 342 of the mobile frame 34 is received in the guiding groove 312. When the mobile sheet 32 is raised upward, the two rear end parts 341 of the mobile frame 34 can be driven to move forward so as to cause the front shaft 342 to move forward in the guiding groove 312.

Another base plate 35 has a buckling part 351 that projects upward and operates coordination with the seat body 31. Grooves 352 and 353 are disposed respectively at the places that the front and rear ends of the buckling part 351 corresponding to the front shaft 342 and sliding shaft 311. The base plates 33 and 35 have multiple of holes 332 and 354 to combine fixing elements to fix on the base plates 21 and 11 respectively as FIG. 3 shows.

A buckling sheet 36 is buckled at the front end of the seat body 31 to seal the front end of the guiding groove 312 so as to allow the front shaft 342 not to separate from the guiding groove 312.

When the front shaft 342 and sliding shaft 311 of the detachable pivot unit 30 are buckled respectively in the grooves 352 and 353 at the front and rear ends of the buckling part 351, the seat 31 and the buckling part 351 form a connection state, and so are the two base plates 33 and 35. The two base plates 33 and 35 as well as the two base plates 11 and 12 are allowed to form a 180° expansion or 90° closing-up assemblage state as FIGS. 1 and 2 shows, because the seat body 31 and the base plate 33 are pivoted together by use of the rotating shaft 331. At this time, the two rear end parts 341 of the mobile frame 34 are located at a place below the front shaft 342 and the sliding shaft 311. The rear end part 341, the front shaft 342 and the sliding shaft 311 form a triangle pattern. The mobile sheet 32 can be kept at a stable state, because the two rear end parts 341 hold up its rear end. The front shaft 342 cannot be driven to move forward unless an outer force is exerted to raise the rear end of the mobile sheet 32 upward to cause the two rear end parts 341 to surpass the line connected between the front shaft 342 and the sliding shaft 311.

When a user raises the mobile sheet 32 upward and the front shaft 342 of the mobile sheet 34 to move forward along the guiding groove 312, the front shaft 342 can be separated from the groove 352 at the front end of the buckling part 351, And then, move the front shaft 342 upward and backward to retreat to a back shrinking section 355 at one side of the groove 352 to cause the sliding shaft 311 to move backward along the long hole 310 to separate from the groove 353 at the rear end of the buckling part 351 so as to separate the seat body 31 and the buckling part 351; this can separate the two base plates 33 and 35 as well as the two bottom 11 and 21 shown in FIG. 2.

The two half-housings form a separation state according to the present invention, this can allow the operation space while assembling is bigger than the operation space while the two half-housings expanding so that every electronic element assemblage and maintenance are more convenient and the density of electronic parts in the assemblage space can be raised. Furthermore, the assemblages of electronic parts can be separated at different companies or locations according to the needs, and then, combine the two half-housings. Whereby, the assemblage operation can be various and more convenient.

The characteristic of the present invention is allowing two half-housings to form an expansible and detachable structure. Using a detachable pivoting element can allow two bottom plates of a housing to be combined to be perpendicular to each other, to be expanded to be level or to be detached. Using a buckling unit can allow the combination and expansion of the two half-housings to be more convenient. The housing according to the present invention can have various different combination types. And further can satisfy a manufacturer or user with different needs.

The description mentioned above is to take the housing of a personal computer as an example to describe, but to the person skilled in the art can easily apply it to housings of the other electronic products according to the present invention.

It is noted that the expansible and detachable housing of a electronic device described above is the preferred embodiment of the present invention for the purpose of illustration only, and are not intended as a definition of the limits and scope of the invention disclosed. Any modifications and variations that maybe apparent to a person skilled in the art are intended to be included within the scope of the present invention.

What is claimed is:

1. An expansible and detachable housing of an electronic device, comprising two half-housings, wherein one of half-housings has a bottom plate connected to a front plate, side plate and back plate; another half-housing has another bottom plate connected to another front plate and another side plate; two base plates of a detachable pivot element are connected to said two bottom plates; whereby, when said two bottom plates are formed a plane, said two half-housings is formed an expansion state; when said two bottom plates are perpendicular to each other, said two half-housings are assembled to a housing; or when said two bottom plates are separated, said two half-housings are formed a separation state.

2. The housing according to claim 1, wherein said detachable pivoting element comprises a seat body having a long hole connected to a sliding shaft; the front end of a mobile sheet is pivoted to said sliding shaft; the front end of a base plate is connected to a rotating shaft; the rear end of said seat body has a guiding groove; a front shaft of said mobile sheet is received in said guiding groove; another base plate has a buckling part that projects upward and operates coordination with said seat body; the front and rear ends of said buckling part have a groove respectively at places corresponding to said front shaft and said sliding shaft.

3. The housing according to claim 1, wherein a flank side of said side plate is connected to a buckling unit; said buckling unit has a buckling end, said buckling end is extended downward out of a groove hole of a flank side of said side plate, an ear sheet is connected to a place inside the flank side of said another side plate corresponding to said buckling end; whereby, said buckling end is buckled with said ear sheet.

4. The housing according to claim 2, wherein a flank side of said side plate is connected to a buckling unit; said buckling unit has a buckling end, said buckling end is extended downward out of a groove hole of a flank side of said side plate, an ear sheet is connected to a place inside the flank side of said another side plate corresponding to said buckling end; whereby, said buckling end is buckled with said ear sheet.

5. The housing according to claim 2, wherein the front end of said seat body is connected to a buckling sheet so as to seal the front end of said guiding groove to allow said front shaft not to separate from said guiding groove.

6. The housing according to claim 2, wherein one side of a groove of the front end of said buckling part has a back shrinking section.

7. The housing according to claim 2, wherein said two base plates has multiple of holes so as to connect fixing elements to fix at said two bottom plates respectively.

8. The housing according to claim 2, wherein the rear end part of said mobile frame is at a place below said front shaft and said sliding shaft, said rear end part, said front shaft and said slicing shaft are formed a triangle pattern so that the rear end of said mobile sheet is held up by said rear end part to keep at a stable state, said front shaft cannot be driven to move frontward unless an outer force is exerted upward to raise the rear end of said mobile sheet to allow said rear end part to surpass a line connected between said front shaft and said sliding axis.

9. The housing according to claim 2, wherein said buckling unit has at least two groove holes receiving a projecting column respectively, said at least two projecting columns are connected to one face of said side plate and have a cap portion with a bigger outer diameter; said cap portions are outside said groove holes respectively so as to allow said buckling unit not to separate from said side plate but to be able to use said groove hole to move to and fro along said projecting column.

10. The housing according to claim 2, wherein a elastic unit is connected between said buckling unit and said top plate so as to allow said buckling unit to bear always a elastic force that said buckling unit is squeezed to one flank side by said elastic unit.

11. The housing according to claim 3, wherein said buckling unit has at least two groove holes receiving a projecting column respectively, said at least two projecting columns are connected to one face of said side plate and have a cap portion with a bigger outer diameter; said cap portions are outside said groove holes respectively so as to allow said buckling unit not to separate from said side plate but to be able to use said groove hole to move to and fro along said projecting column.

12. The housing according to claim 3, wherein a elastic unit is connected between said buckling unit and said top plate so as to allow said buckling unit to bear always a elastic force that said buckling unit is squeezed to one flank side by said elastic unit.

13. The housing according to claim 11, wherein said one side of said groove holes has a bigger diameter so as to allow said cap portions to pass through said bigger diameter sides and to be stuck outside smaller diameter sides.

14. The housing according to claim 9, wherein said one side of said groove holes has a bigger diameter so as to allow said cap portions to pass through said bigger diameter sides and to be stuck outside smaller diameter sides.

* * * * *